(12) United States Patent
Umeki et al.

(10) Patent No.: US 11,287,026 B2
(45) Date of Patent: Mar. 29, 2022

(54) LUBRICATING DEVICE OF POWER TRANSMITTING SYSTEM

(71) Applicant: TOYOTA JIDOSHA KABUSHIKI KAISHA, Toyota (JP)

(72) Inventors: Ryo Umeki, Okazaki (JP); Tetsuo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 16/669,590

(22) Filed: Oct. 31, 2019

(65) Prior Publication Data
US 2020/0132184 A1 Apr. 30, 2020

(30) Foreign Application Priority Data
Oct. 31, 2018 (JP) .............................. JP2018-206091

(51) Int. Cl.
*F16H 57/04* (2010.01)

(52) U.S. Cl.
CPC ..... *F16H 57/0423* (2013.01); *F16H 57/0441* (2013.01); *F16H 57/0456* (2013.01)

(58) Field of Classification Search
CPC ............. F16H 57/0423; F16H 57/0442; F16H 57/046; F16H 57/0456
See application file for complete search history.

(56) References Cited

U.S. PATENT DOCUMENTS

| | | | | |
|---|---|---|---|---|
| 4,922,765 A | * | 5/1990 | Hayakawa | B60K 17/344 184/6.12 |
| 5,662,188 A | * | 9/1997 | Ito | B62D 5/07 184/11.1 |
| 2006/0076193 A1 | * | 4/2006 | Ruther | F16H 57/0456 184/6.12 |
| 2015/0285368 A1 | * | 10/2015 | McLauchlan | F16H 57/0421 184/6.12 |
| 2016/0025205 A1 | * | 1/2016 | Smith | F16H 57/0436 184/6.12 |
| 2018/0106357 A1 | * | 4/2018 | Kawakami | F16H 57/0479 |
| 2018/0106359 A1 | * | 4/2018 | Kawakami | F16H 57/04 |
| 2019/0390760 A1 | * | 12/2019 | Esders | F16H 57/0421 |
| 2020/0124162 A1 | * | 4/2020 | Fujii | F16H 57/045 |
| 2020/0271194 A1 | * | 8/2020 | Takahashi | F16H 48/38 |

FOREIGN PATENT DOCUMENTS

JP 2007-024234 A 2/2007
JP 2017-136964 A 8/2017

* cited by examiner

*Primary Examiner* — Minh Truong
(74) *Attorney, Agent, or Firm* — Oliff PLC

(57) ABSTRACT

A lubricating device of a power transmitting system including a power transmitting mechanism. The lubricating device includes: an oil reservoir; an oil pump; an oil catcher provided to receive a portion of the oil delivered from the oil pump; and an oil piping assembly through which the oil delivered from the oil pump flows to be delivered to each of the at least one lubricated portion. The oil piping assembly has a first oil delivery nozzle from which the oil is delivered to each lubricated portion, and a second oil delivery nozzle from which the portion of the oil delivered from the oil pump flows into the oil catcher. The second oil delivery nozzle has a length larger than that of the first oil delivery nozzle.

4 Claims, 7 Drawing Sheets

LUBRICATING DEVICE OF POWER TRANSMITTING SYSTEM

This application claims priority from Japanese Patent Application No. 2018-206091 filed on Oct. 31, 2018, the disclosure of which is herein incorporated by reference in its entirety.

FIELD OF THE INVENTION

The present invention relates in general to a lubricating device of a power transmitting system, and more particularly to a lubricating device which is configured to deliver an oil to at least one lubricated portion and which includes an oil catcher to receive a portion of the delivered oil.

BACKGROUND OF THE INVENTION

There is known a lubricating device of a power transmitting system including a power transmitting mechanism accommodated within a casing. The lubricating device includes: an oil reservoir provided in a bottom portion of the casing; an oil pump configured to suck an oil from the oil reservoir, and pressurize the oil and deliver the pressurized oil to each lubricated portion of the power transmitting mechanism; and an oil catcher provided to receive a portion of the oil delivered from the oil pump. An excessively large amount of the oil delivered to the lubricated portion leads to a large loss of power to be transmitted through the power transmitting mechanism. To reduce the power loss, the oil catcher is provided to receive an excess of the delivered oil, for reducing an amount of the oil to be supplied to the lubricated portion. JP2017-136964A discloses an example of this type of lubricating device, which includes an oil storage provided as the oil catcher, and a mechanical oil pump (P1) mechanically connected to a vehicle drive wheel and operated with a rotary motion of the vehicle drive wheel. It is to be understood that a concept of "lubrication" referred to in the present specification is interpreted to mean not only a supply of a lubricant oil to desired parts of the power transmitting mechanism to prevent or reduce friction or wearing of these desired parts, but also a supply of the lubricant oil to the desired parts to cool these parts.

SUMMARY OF THE INVENTION

By the way, it is considered to use an oil piping assembly for delivering the oil to each lubricated portion of the power transmitting mechanism. The oil piping assembly has a first oil delivery nozzle from which the oil is delivered to the lubricated portion, and a second oil delivery nozzle from which the oil flows into the oil catcher. A sufficient amount of the oil can be delivered from the first oil delivery nozzle to the lubricated portion, by reducing a diameter of the second oil delivery nozzle, even when the oil has a comparatively low temperature and an accordingly high degree of viscosity. However, the reduction of the diameter of the second oil delivery nozzle reduces an amount of the oil flowing from the second oil delivery nozzle into the oil catcher, so that an excessively large amount of the oil is delivered from the first oil delivery nozzle to the lubricated portion, even when the oil has a comparatively high temperature and an accordingly low degree of viscosity. Where the diameter of the second oil delivery nozzle has a diameter large enough to permit an adequate amount of the oil to be delivered into the oil catcher, on the other hand, a sufficient amount of the oil cannot be delivered from the first oil delivery nozzle to the lubricated portion when the oil has a comparatively low temperature and an accordingly high degree of viscosity, so that there is a risk of deterioration of an anti-seizure function and other lubricating performance, and cooling performance of the lubricating device.

The present invention was made in view of the background art described above. It is an object of the present invention to provide a lubricating device of a power transmitting system, which permits an excess of an oil delivered from the second oil delivery nozzle, to be received in the oil catcher to prevent delivery of an excessively large amount of the oil from the first oil delivery nozzle to each lubricated portion, when the oil has a comparatively high temperature, while at the same time ensuring delivery of a sufficient amount of the oil from the first oil delivery nozzle to the lubricated portion when the oil has a comparatively low temperature.

The object indicated above is achieved according to the following modes of the present invention:

According to a first mode of the invention, there is provided a lubricating device of a power transmitting system including a power transmitting mechanism accommodated in a casing, comprising: an oil reservoir formed in a bottom portion of the casing; an oil pump operated to suck an oil from the oil reservoir, and pressurize the oil and deliver the pressurized oil to at least one lubricated portion of the power transmitting mechanism; an oil catcher provided to receive a portion of the oil delivered from the oil pump; and an oil piping assembly through which the oil delivered from the oil pump flows to be delivered to each of the at least one lubricated portion. The oil piping assembly has a first oil delivery nozzle from which the oil is delivered to each lubricated portion, and a second oil delivery nozzle from which the portion of the oil delivered from the oil pump flows into the oil catcher. The second oil delivery nozzle has a length larger than that of the first oil delivery nozzle.

According to a second mode of the invention, the lubricating device according to the first mode of the invention is provided to lubricate the power transmitting system configured to transmit an output of a drive power source of a vehicle to drive wheels of the vehicle, and the oil pump is a mechanical oil pump mechanically connected to the drive wheels so that the oil pump is operated with rotary motions of the drive wheels.

According to a third mode of the invention, the lubricating device according to the first or second mode of the invention is configured such that the oil piping assembly has a projecting oil delivery portion extending outwardly from an outer wall surface thereof, and the projecting oil delivery portion is provided with the second oil delivery nozzle.

According to a fourth mode of the invention, the lubricating device according to the third mode of the invention is configured such that the oil piping assembly is a resin piping assembly having a plurality of divisional components each of which is formed of a resin material and which have respective interfacial surfaces. The plurality of divisional components are bonded together with the interfacial surfaces being held in abutting contact with each other, so as to define an oil passage through which the oil flows. The projecting oil delivery portion is formed integrally with one of the plurality of divisional components.

In the lubricating device according to the first mode of the invention, the length of the second oil delivery nozzle from which the oil flows into the oil catcher is larger than that of the first oil delivery nozzle from which the oil is delivered to each lubricated portion. Accordingly, when the oil has a comparatively low temperature and an accordingly high degree of viscosity, an amount of friction of the oil with respect to an inner wall surface of the second oil delivery nozzle having the comparatively large length is comparatively large so that an amount of the oil flowing from the second oil delivery nozzle into the oil catcher is restricted, whereby a sufficient amount of the oil can be delivered from the first oil delivery nozzle to each lubricated portion. When the oil has a comparatively high temperature and an accordingly low degree of viscosity, on the other hand, the amount of friction of the oil with respect to the inner wall surface of the second oil delivery nozzle is comparatively small so that the oil can easily flow from the second oil delivery nozzle into the oil catcher, whereby an excessive amount of supply of the oil from the first oil delivery nozzle to the lubricated portion is prevented. Namely, the present lubricating device permits an excess of an oil delivered from the second oil delivery nozzle, to be received in the oil catcher to prevent delivery of an excessively large amount of the oil from the first oil delivery nozzle to each lubricated portion, when the oil has a comparatively high temperature, while at the same time ensuring delivery of a sufficient amount of the oil from the first oil delivery nozzle to the lubricated portion when the oil has a comparatively low temperature. Thus, the present lubricating device ensures effective reduction of a loss of power to be transmitted through the power transmitting mechanism, as well as high degrees of anti-seizure function and other lubricating performance, and cooling performance.

The lubricating device according to the second mode of the invention is provided to lubricate the power transmitting system of a vehicle. In this vehicular lubricating device, the oil pump is the mechanical oil pump mechanically connected to the drive wheels so that the oil pump is operated with the rotary motions of drive wheels of the vehicle. An amount of the oil delivered from the mechanical oil pump is determined by a running speed of the vehicle, so that a comparatively large amount of the oil is delivered from the mechanical oil pump when the vehicle running speed is comparatively high. Accordingly, the provision of the oil catcher permits effective reduction of the loss of power to be transmitted through the power transmitting system. Although the amount of the oil to be delivered from the oil pump cannot be controlled in the present lubricating device, the length of the second oil delivery nozzle is determined to be larger than that of the first oil delivery nozzle, so that an excess of the oil delivered from the second oil delivery nozzle is received in the oil catcher to prevent delivery of an excessively large amount of the oil from the first oil delivery nozzle to each lubricated portion, when the oil has a comparatively high temperature, while at the same time a sufficient amount of the oil is delivered from the first oil delivery nozzle to the lubricated portion when the oil has a comparatively low temperature.

In the lubricating device according to the third mode of the invention, the oil piping assembly has the projecting oil delivery portion extending outwardly from its outer wall surface, and the projecting oil delivery portion is provided with the second oil delivery nozzle. Accordingly, the length of the second oil delivery nozzle can be easily adjusted by forming the projecting oil delivery portion with a suitable distance of extension outwardly of the oil piping assembly.

In the lubricating device according to the fourth mode of the invention, the oil piping assembly is the resin piping assembly constituted by the plurality of divisional components bonded to each other so as to define the oil passage, and the projecting oil delivery nozzle is formed integrally with one of the plurality of divisional components. This resin piping assembly is more economical to manufacture than an oil piping assembly to which an oil delivery nozzle member formed separately from the oil piping assembly and having a suitable length dimension is fixed with screws or other fastening means.

DETAILED DESCRIPTION OF THE INVENTION

Figure 1:
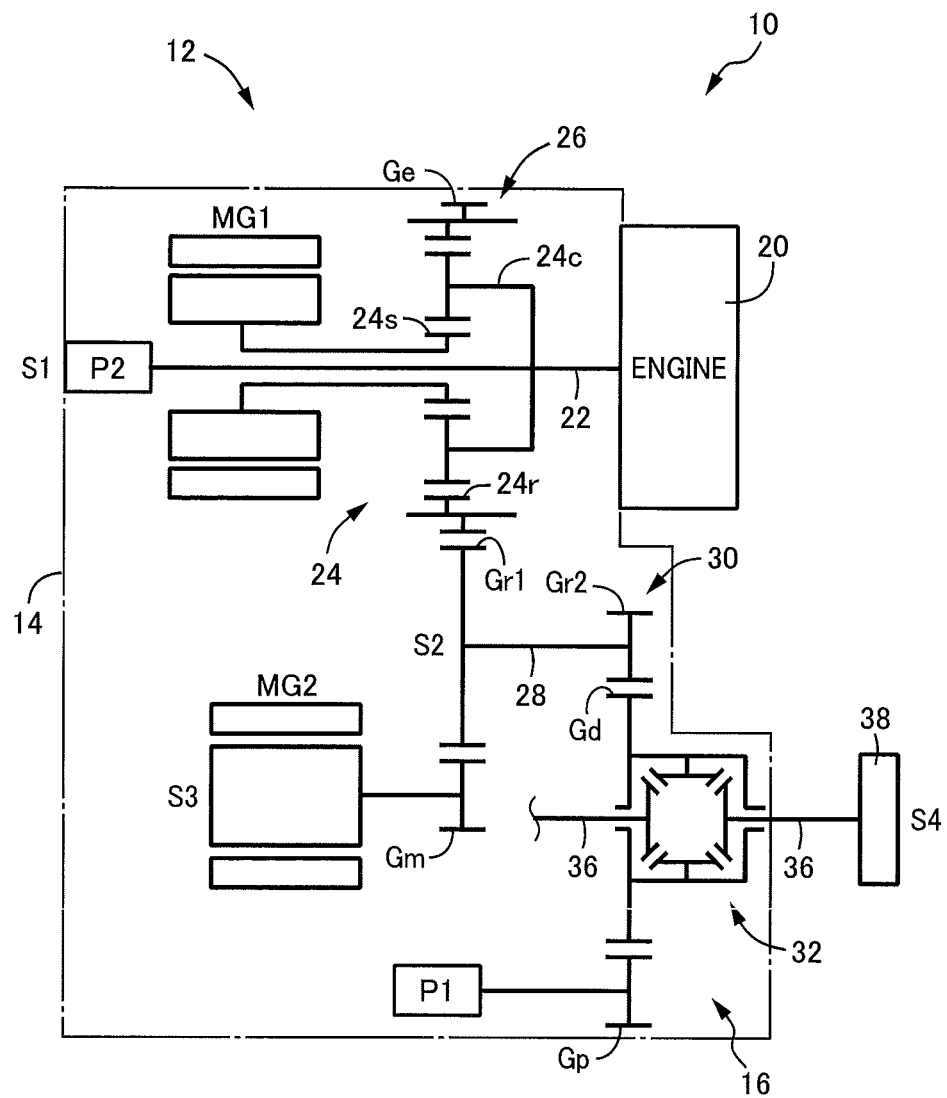
FIG. 1 is a schematic view showing an arrangement of a power transmitting system of a hybrid vehicle, which is provided with a lubricating device according to one embodiment of this invention.

The lubricating device according to the present invention is suitably applicable to a power transmitting system of various types of vehicle, such as an engine-drive vehicle, a hybrid vehicle having as a vehicle drive power source device not only an engine but also a vehicle driving electric motor, and an electric vehicle having an electric motor as a vehicle drive power source device. Further, the lubricating device is applicable to a power transmitting system in which an oil is delivered to at least one lubricated portion and an oil catcher through an oil piping assembly. A power transmitting mechanism of the power transmitting system may be configured such that a portion of the power transmitting mechanism is immersed in and lubricated with an oil stored in an oil reservoir, some of lubricated portions of the power transmitting mechanism are lubricated with the oil splashed up from the oil reservoir. For example, a portion or an entirety of a differential gear device of a bevel gear type or planetary gear type located at a comparatively low position is immersed in the oil in the oil reservoir. Alternatively, the entirety of the power transmitting mechanism may be located above the level of the oil in the oil reservoir, and may be lubricated with the oil delivered from the oil reservoir by an oil pump.

For example, the oil pump is a mechanical oil pump connected to and rotated by an output rotary member of the power transmitting mechanism, which is rotated with a vehicle drive wheel, or connected to and rotated by any other pump driving member other than the output rotary member. Alternatively, the oil pump is an electric oil pump operated by an electric motor used exclusively for operating the oil pump. Where the power transmitting mechanism is provided on an electric vehicle having an electric motor as the vehicle drive power source is connected to the drive wheels through a gear mechanism or a differential gear device, the entirety of the power transmitting mechanism is considered as an output rotary device rotated with the drive wheels.

The lubricating device may include only one oil pump, but may further include a second oil pump of a mechanically or electrically operated type. The at least one lubricated portion to be lubricated with the oil delivered from a first oil delivery nozzle is preferably at least one portion of the power transmitting mechanism not immersed in the oil in the oil reservoir, such as friction or heat generating portions required to be lubricated and cooled, for instance, mutually meshing power transmitting gears and a power transmitting belt, and bearings rotatably supporting rotary shafts. The present lubricating device may be configured to deliver the oil to heat generating portions or other portions of an electric motor or an electric generator provided in a hybrid vehicle or an electric vehicle, other than the heat generating portions of the power transmitting mechanism. The lubricating device may be configured to deliver the oil from the oil pump directly to each lubricated portion, or through an oil cooler or any other heat exchanger disposed between the oil pump and the lubricated portion.

The oil piping assembly is preferably a resin piping assembly consisting of a plurality of divisional components. However, the oil piping assembly may be a metallic piping assembly. The oil piping assembly is provided with at least one projecting oil delivery portion formed integrally with or fixed to its wall such that each projecting oil delivery portion projects from the wall. The oil delivery nozzle (second oil delivery nozzle) formed through the projecting oil delivery portion may extend into an oil passage formed through the oil piping assembly, so that the oil delivery nozzle has a sufficiently large length. The length of the oil delivery nozzle of the projecting oil delivery portion is a distance from an end of the oil delivery nozzle on the side of the oil passage to the other end outside of the oil passage. Where the oil delivery nozzle extends linearly from the oil piping assembly, the length is a dimension of the oil delivery nozzle in the direction of its linear extension. For example, the oil catcher is generally formed integrally with or fixed to an inner wall of the casing. However, the oil catcher may be fixed to the oil piping assembly. The oil catcher is preferably an oil catcher tank capable of temporally storing the oil, but may be configured to permit the received oil to be delivered to the lubricated portion or back into the oil reservoir. The oil catcher may be an upwardly open part of the casing. For example, the oil catcher has a drain port formed in its bottom portion, so that the oil slowly flows down through the drain port.

The first and second oil delivery nozzles may have the same diameter, or respective different diameters. Each of the first and second oil delivery nozzles may have a constant diameter over its entire length. However, the diameter of each oil delivery nozzle may change in steps in its direction of extension. The first and second oil delivery nozzles (first and second oil delivery portions of the oil piping assembly) are suitably determined depending upon the positions of the lubricated portion or portions. However, the second oil delivery nozzle is preferably located above the first oil delivery nozzle, or at a position of the oil piping assembly which is more distant from the oil pump than the first oil delivery nozzle.

Embodiment

A preferred embodiment of the present invention will be described in detail by reference to the drawings. It is to be understood that the drawings are simplified and transformed as needed, and do not necessarily accurately represent dimensions and shapes of various elements of the embodiment.

Reference is first made to FIG. 1, which is the schematic view showing an arrangement of a hybrid vehicle 10 including a transaxle 12 provided with a lubricating device 40 according to one embodiment of this invention. The transaxle 12 includes a power transmitting mechanism 16 having a plurality of axes which are shown in a common plane of the view of FIG. 1. The transaxle 12 is configured to transmit an output of a drive power source in the form of an engine 20 to left and right drive wheels 38, and is of a transversely mounted type installed on the hybrid vehicle 10 of an FF type, for example, such that the plurality of axes of the power transmitting mechanism 16 of a gear type are parallel to a width or transverse direction of the hybrid vehicle 10. The power transmitting mechanism 16 is accommodated within a casing 14. The engine 20 is an internal combustion engine such as a gasoline or diesel engine, which generates a vehicle drive force by combustion of a fuel. The transaxle 12 is a power transmitting system, and the casing 14 consists of a plurality of members as needed.

The power transmitting mechanism 16 has first through fourth axes S1-S4 substantially parallel to the width direction of the hybrid vehicle 10. On the first axis S1, there are disposed: an input shaft 22 connected to the engine 20 functioning as the drive power source; a planetary gear set 24 of a single-pinion type; and a first motor/generator MG1. The planetary gear set 24 and the first motor/generator MG1 function as an electrically controlled differential portion 26. The planetary gear set 24 functions as a differential mechanism, and includes a carrier $24c$ connected to the input shaft 22, a sun gear $24s$ connected to the first motor/generator MG1, and a ring gear $24r$ provided with an engine output gear Ge. The first motor/generator MG1 is operated selectively as an electric motor or an electric generator. When the first motor/generator MG1 is operated as the electric generator, a rotating speed of the sun gear $24s$ is continuously controlled by a regenerative control of the first motor/generator MG1, so that an operating speed of the engine 20 is continuously varied, and a rotary motion of the engine 20 is output from the engine output gear Ge. When the sun gear $24s$ is placed in a freely rotatable state with torque of the first motor/generator MG1 being zeroed, the engine 20 and the power transmitting mechanism 16 are disconnected from each other, so that dragging of the engine 20 by the power transmitting mechanism 16 is prevented. The first motor/generator MG1 functions as a differential control motor/generator.

On the second axis S2, there is disposed a speed reducing gear device 30 including a shaft 28 provided with a large-diameter speed reducing gear Gr1 and a small-diameter speed reducing gear Gr2. The large-diameter speed reducing gear Gr1 is held in meshing engagement with the engine output gear Ge, and a motor output gear Gm of a second motor/generator MG2 disposed on the third axis S3. The second motor/generator MG2 is operated selectively as an electric motor or an electric generator. The second motor/ generator MG2 serves as a drive power source for driving the hybrid vehicle 10 when the second motor/generator MG2 is operated as the electric motor. Thus, the second motor/generator MG2 is operable as a vehicle driving electric motor.

The small-diameter speed reducing gear Gr2 is held in meshing engagement with a differential ring gear Gd of a differential gear device 32 disposed on the fourth axis S4, so that drive forces of the engine 20 and the second motor/generator MG2 are distributed to left and right drive shafts 36 through the differential gear device 32, and transmitted to the left and right drive wheels 38. The engine output gear Ge, the large-diameter speed reducing gear Gr1, the small-diameter speed reducing gear Gr2 and the differential ring gear Gd primarily constitute a gear mechanism. The fourth axis S4 of the first through fourth axes S1-S4 is the axis located at the lowest position in the hybrid vehicle 10, and a bottom portion of the casing 14 serves as an oil reservoir 46 storing a lubricant oil 48, as shown in FIG. 2, so that a lower portion of the differential gear device 32 is immersed in a bath of the lubricant oil 48.

The hybrid vehicle 10 constructed as described above is placed in a selected one of an EV (electric vehicle) drive mode and an HV (hybrid vehicle) drive mode, according to a drive mode switching map and on the basis of a required vehicle drive force (as represented by an operation amount of an accelerator pedal) and a running speed V of the hybrid vehicle 10, for example. In the EV drive mode, the hybrid vehicle 10 is driven with the second motor/generator MG2 operated as the drive power source, while the engine 20 is held at rest. This EV drive mode is selected when the required vehicle drive force is comparatively small, namely, when the hybrid vehicle 10 is in a low-load running state. In the EV drive mode, a fuel supply to the engine 20 is stopped, and the torque of the first motor/generator MG1 is zeroed, so that the sun gear 24s of the planetary gear set 24 is freely rotatable, and the first motor/generator MG1 is held substantially at rest, even in a running state of the hybrid vehicle 10. In the HV drive mode, the hybrid vehicle 10 is driven with the engine 20 operated as the drive power source, while a regenerative operation of the first motor/generator MG1 is controlled. The HV drive mode is selected when the required vehicle drive force is comparatively large, namely, when the hybrid vehicle 10 is in a high-load running state. In this HV drive mode, the second motor/generator MG2 is operated as the drive power source when generation of an assisting torque is required to accelerate the hybrid vehicle 10, for example, or is kept operated as the drive power source.

The hybrid vehicle 10 may be placed in an engine drive mode in place of the above-described HV drive mode, or as well as in the HV drive mode. In the engine drive mode, only the engine 20 is operated as the drive power source. Although the arrangement of the transaxle 12 of the hybrid vehicle 10 has been described for illustrative purpose only, the transaxle 12 may be constructed with various changes or modifications. For example, the planetary gear set 24 of the single-pinion type may be replaced by a planetary gear set of a double-pinion type, or a plurality of planetary gear sets. Further, the second motor/generator MG2 may be disposed on the first axis S1, and the electrically controlled differential portion 26 may be replaced by a mechanically operated transmission.

Figure 2:
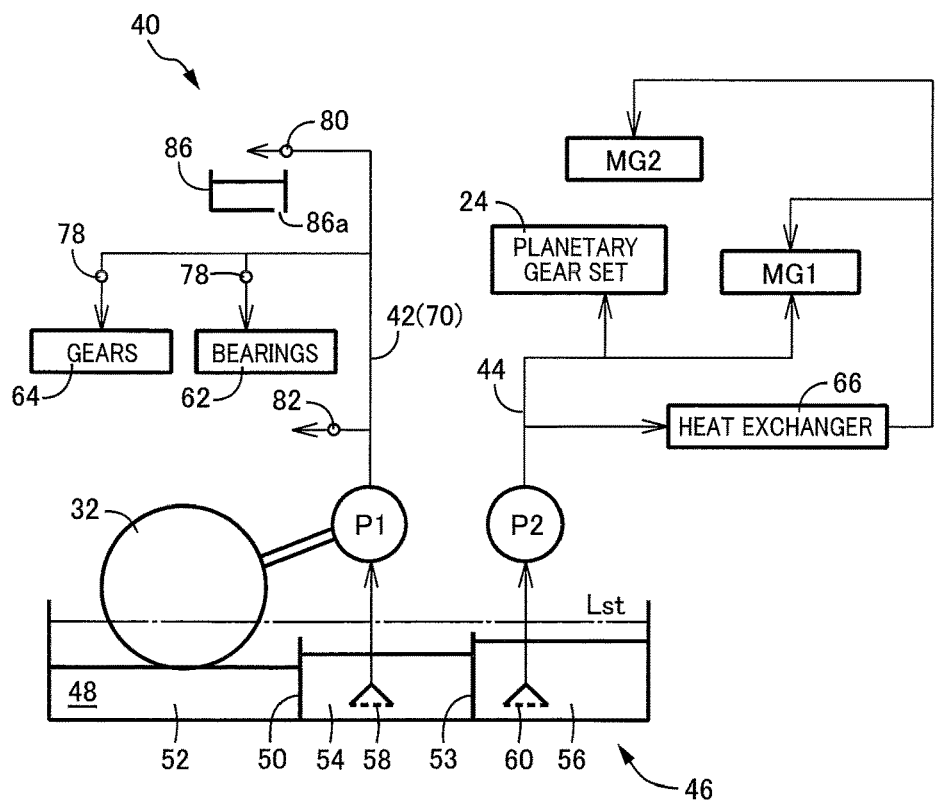
FIG. 2 is a hydraulic circuit diagram illustrating the lubricating device provided in the power transmitting system shown in FIG. 1.

In the present embodiment of the invention, the transaxle 12 of the hybrid vehicle 10 is provided with the above-indicated lubricating device 40 shown in FIG. 2. The lubricating device 40 includes a first oil pump P1 and a second oil pump P2 as an oil pumping device. The first and second oil pumps P1 and P2 are connected to respective first and second oil supply passages 42 and 44 which are independent of each other, and which are assigned to respective groups of predetermined lubricated portions of the power transmitting mechanism 16. As shown in FIG. 1, the first oil pump P1 is a mechanical pump mechanically operated by a pump driving gear Gp held in meshing engagement with the differential ring gear Gd, while the second oil pump P2 is a mechanical pump mechanically operated by the engine 20 through the input shaft 22. The first oil pump P1 may be modified such that the pump driving gear Gp is held in meshing engagement with the large-diameter speed reducing gear Gr1 or the small-diameter speed reducing gear Gr2, which is rotated in synchronization with the differential ring gear Gd. The second oil pump P2 is an oil pump operated by a drive power source different from a vehicle drive force output portion in the form of the differential gear device 32, that is, an oil pump operated by the engine 20. However, the second oil pump P2 may be replaced by an electrically operated oil pump operated by an exclusive pump driving electric motor. The differential gear device 32 is the vehicle drive force output portion rotated with the drive wheels 38, while the first oil pump P1 is the mechanical oil pump mechanically connected to the vehicle drive force output portion in the form of the differential gear device 32.

The first and second oil pumps P1 and P2 described above are configured to suck the lubricant oil 48 from the oil reservoir 46 located in the bottom portion of the casing 14, and to deliver the lubricant oil 48 through the first and second oil supply passages 42 and 44. While the oil reservoir 46 is constituted by the casing 14, the oil reservoir 46 may be replaced by an oil pan or any other member fixed to a lower portion of the casing 14. A space formed within the oil reservoir 46 is divided by a first partition wall 50 into a rear portion (left-hand side portion as seen in FIG. 2) as seen in a longitudinal direction of the hybrid vehicle 10, and the other portion. This rear portion of the space serves as a first oil reservoir portion 52 located below the differential gear device 32. The above-indicated other portion of the space is divided by a second partition wall 53 into two parts located adjacent to each other in the longitudinal direction of the hybrid vehicle 10, namely, a second oil reservoir portion 54 located adjacent to the first oil reservoir portion 52, and a third oil reservoir portion 56 located adjacent to the second oil reservoir portion 54. A suction port 58 of the first oil pump P1 is disposed within the second oil reservoir portion 54, while a suction port 60 of the second oil pump P2 is disposed within the third oil reservoir portion 56. These two suction ports 58 and 60 are connected to the respective first and second oil pumps P1 and P2 through respective suction passages.

The first and second partition walls 50 and 53 function as an oil-flow restricting portion which allows but restricts flows of the lubricant oil 48 between the first and second oil reservoir portions 52 and 54, and between the second and third oil reservoir portions 54 and 56, such that baths of the lubricant oil 48 in the first, second and third oil reservoir portions 52, 54 and 56 have different levels, when the first and second oil pumps P1 and P2 are operated. Namely, when the first and second oil pumps P1 and P2 are both held at rest while the hybrid vehicle 10 is stationary, the baths of the lubricant oil 48 in all of the three oil reservoir portions 52, 54 and 56 have the same level, that is, a static level Lst indicated by a one-dot chain line in FIG. 2, which level Lst is higher than upper ends of the first and second partition walls 50 and 53, since the oil 48 delivered to the various lubricated portions of the transaxle 12 drops down into the oil reservoir 46 while the oil pumps P1 and P2 are held at rest. When the oil pumps P1 and P2 are operated during running of the hybrid vehicle 10, however, the oil 48 is delivered from the oil pumps P1 and P2 to the various lubricated portions of the transaxle 12, so that a volume of the lubricant oil 48 staying in the oil reservoir 46 is reduced, whereby the levels of the baths of the lubricant oil 48 in the oil reservoir portions 52, 54 and 56 are lowered below the upper ends of the partition walls 50 and 53, and to respective different heights indicated by solid lines in FIG. 2, due to the flow restricting function of the partition walls 50 and 53.

The upper ends of the first and second partition walls 50 and 53 are higher than the lower end of the differential gear device 32, so that a lower portion of the differential gear device 32 is immersed in the bath of the lubricant oil 48 in the first oil reservoir portion 52 while the level of the lubricant oil 48 in the oil reservoir 46 is higher than the upper ends of the partition walls 50 and 53 in the stationary state of the hybrid vehicle 10. When the hybrid vehicle 10 is started in this stationary state in which the differential gear device 32 is partially immersed in the bath of the lubricant oil 48 in the first oil reservoir portion 52, the lubricant oil 48 is splashed up by the differential ring gear Gd, and is scattered over the lubricated portions of the transaxle 12, so that these lubricated portions can be sufficiently lubricated during starting of the hybrid vehicle 10 wherein the first oil pump P1 has difficulty to deliver a sufficient amount of the lubricant oil 48.

While the oil pumps P1 and P2 are operated during running of the hybrid vehicle 10, on the other hand, the level of the lubricant oil 48 is lowered below the upper ends of the partition walls 50 and 53 as a result of splashing of the lubricant oil 48 by the differential ring gear Gd rotated according to the running speed V of the hybrid vehicle 10, and suction of the lubricant oil 48 by the oil pumps P1 and P2. The level of the bath of the lubricant oil 48 in the first oil reservoir portion 52 is determined by a difference between the amount of the lubricant oil 48 splashed up by the differential ring gear Gd and the amount of the lubricant oil 48 returned back into the first oil reservoir portion 52, and the level of the bath of the lubricant oil 48 in the second oil reservoir portion 54 is determined by a difference between the amount of the lubricant oil 48 sucked by the first oil pump P1 and the amount of the lubricant oil 48 returned back into the second oil reservoir portion 54, while the level of the bath of the lubricant oil 48 in the third oil reservoir portion 56 is determined by a difference between the amount of the lubricant oil 48 sucked by the second oil pump P2 and the amount of the lubricant oil 48 returned back into the third oil reservoir portion 56. In the present embodiment, the volume of the first oil reservoir portion 52 is determined, namely, the position and shape of the first partition wall 50 are determined such that the level of the bath of the lubricant oil 48 in the first oil reservoir portion 52 can be lowered to a lowest position, so that agitation of the lubricant oil 48 by the rotary motion of the differential gear device 32 is restricted to reduce a power loss due to the agitation. Further, the levels of the baths of the lubricant oil 48 in the second and third oil reservoir portions 54 and 56 in which the suction ports 58 and 60 are disposed are made higher than the level in the first oil reservoir portion 52, so that it is possible to reduce a risk of air suction by the oil pumps P1 and P2 due to exposure of the suction ports 58 and 60 above the levels of the baths of the lubricant oil 48 in the second and third oil reservoir portions 54 and 56, whereby the lubricant oil 48 can be adequately sucked by the oil pumps P1 and P2, and stably delivered to the predetermined lubricated portions of the transaxle 12.

In addition, the second and third oil reservoir portions 54 and 56 which are separated from each other by the second partition wall 53 in the longitudinal direction of the hybrid vehicle 10 have comparatively small dimensions in the longitudinal direction, making it possible to reduce an amount of variation, in the longitudinal direction, of a distance from the bottoms of the oil reservoir portions 54 and 56 to the oil levels of the baths of the lubricant oil 48 therein, which variation takes place due to a change of attitude of the hybrid vehicle 10 according to a gradient of the roadway surface, or acceleration or deceleration of the hybrid vehicle 10, whereby it is possible to more effectively reduce the risk of air suction by the oil pumps P1 and P2 the suction ports 58 and 60 of which are disposed in the oil reservoir portions 54 and 56. In this respect, it is noted that the first and second partition walls 50 and 53 may have the same height dimension, and that the first and second partition walls 50 and 53 need not be provided.

The first oil pump P1 is operatively connected to and operated by the vehicle drive force output portion in the form of the differential gear device 32, and the first oil supply passage 42 connected to a delivery port of the first oil pump P1 is provided to deliver the lubricant oil 48 to the lubricated portions of the power transmitting mechanism 16. The lubricated portions include bearings 62 and gears 64 (Ge, Gr1, Gr2, Gd, Gm, Gp) incorporated in the power transmitting mechanism 16, and the differential gear device 32. The first oil pump P1 is operatively connected to and operated by the differential gear device 32, and is therefore operated even in the EV drive mode in which the engine 20 is held at rest, so that the first oil pump P1 is able to suck the lubricant oil 48 by an amount according to the vehicle running speed V, and to deliver the lubricant oil 48 to the lubricated portions. That is, the vehicle running speed V corresponds to an operating speed of the first oil pump P1, and to a volume of the lubricant oil 48 delivered from the first oil pump P1. Although the differential gear device 32 is lubricated with the lubricant oil 48 splashed up by the differential ring gear Gd, the differential gear device 32 may be lubricated with the lubricant oil 48 delivered through the first oil supply passage 42. Further, an oil storage may be provided as needed to ensure a stable supply of the lubricant oil 48 to the first oil pump P1, for preventing a risk of air suction by the first oil pump P1.

The second oil supply passage 44 is connected to a delivery port of the second oil pump P2, to deliver the lubricant oil 48 to the predetermined lubricated portions located upwardly of the second and third oil reservoir portions 54 and 56. These lubricated portions include: the input shaft 22; the planetary gear set 24; and the first motor/generator MG1. The second oil supply passage 42 is provided with a heat exchanger 66 to cool the lubricant oil 48, so that the cooled lubricant oil 48 is delivered to the first motor/generator MG1 and the second motor/generator MG2, for cooling and preventing overheating of the motor/generator MG1 and the motor/generator MG2. For example, the heat exchanger 66 is an oil cooler of an air cooling or water cooling type for cooling the lubricant oil 48. Since the engine 20 used to operate the second oil pump P2 can be operated even while the hybrid vehicle 10 is stationary, an adequate amount of the lubricant oil 48 can be sucked by and delivered to the lubricated portions from the second oil pump P2, irrespective of a variation of the vehicle running speed V, even while the hybrid vehicle 10 is stationary. It is noted that the second oil pump P2 may be dispensed with, provided the first oil pump P1 is adapted to deliver the lubricant oil 48 through both of the first and second oil supply passages 42 and 44, by connecting these two oil supply passages 42 and 44 to each other, for example.

Figure 3:
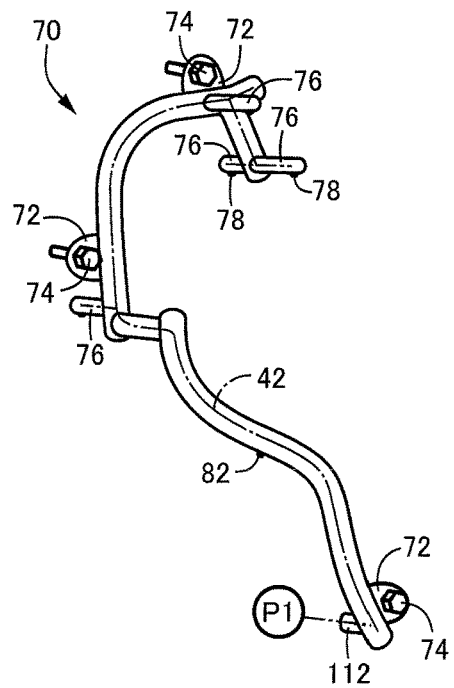
FIG. 3 is a schematic perspective view showing a resin piping assembly which provides a first oil supply passage of the lubricating device shown in FIG. 2.

FIG. 3 is the schematic perspective view showing a resin piping assembly 70 having the first oil supply passage 42 of the lubricating device 40 shown in FIG. 2. The resin piping assembly 70 is formed separately from the casing 14, and is provided with a plurality of fixing portions 72, which are to be fixed to an inner wall surface of the casing 14 or to an outer surface of a housing of the first oil pump P1, with fastening bolts 74, such that the resin piping assembly 70 is located at a predetermined position within the casing 14. The resin piping assembly 70 has a plurality of hollow projecting nozzle portions 76 from which the lubricant oil 48 is ejected toward the bearings 62 and the gears 64. The resin piping assembly 70 has a three-dimensionally bent generally hollow structure. The plurality of projecting nozzle portions 76 extend in a substantially horizontal direction, and each of the projecting nozzle portions 76 has a first oil delivery portion 78 formed in its distal end part or intermediate part such that the first oil delivery portion 78 is open downwards.

Figure 4:
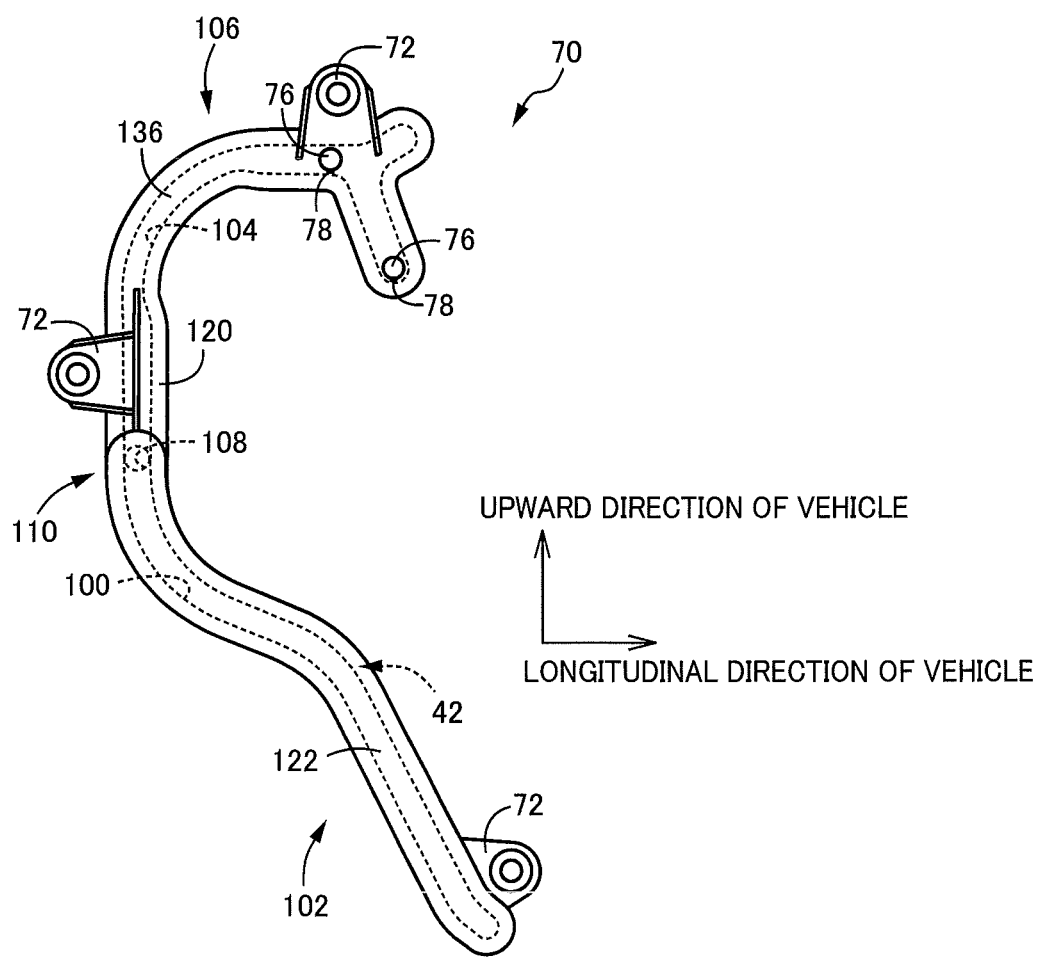
FIG. 4 is a front elevational view of the resin piping assembly of FIG. 3 as seen in a width or transverse direction of the hybrid vehicle.
Figure 5:
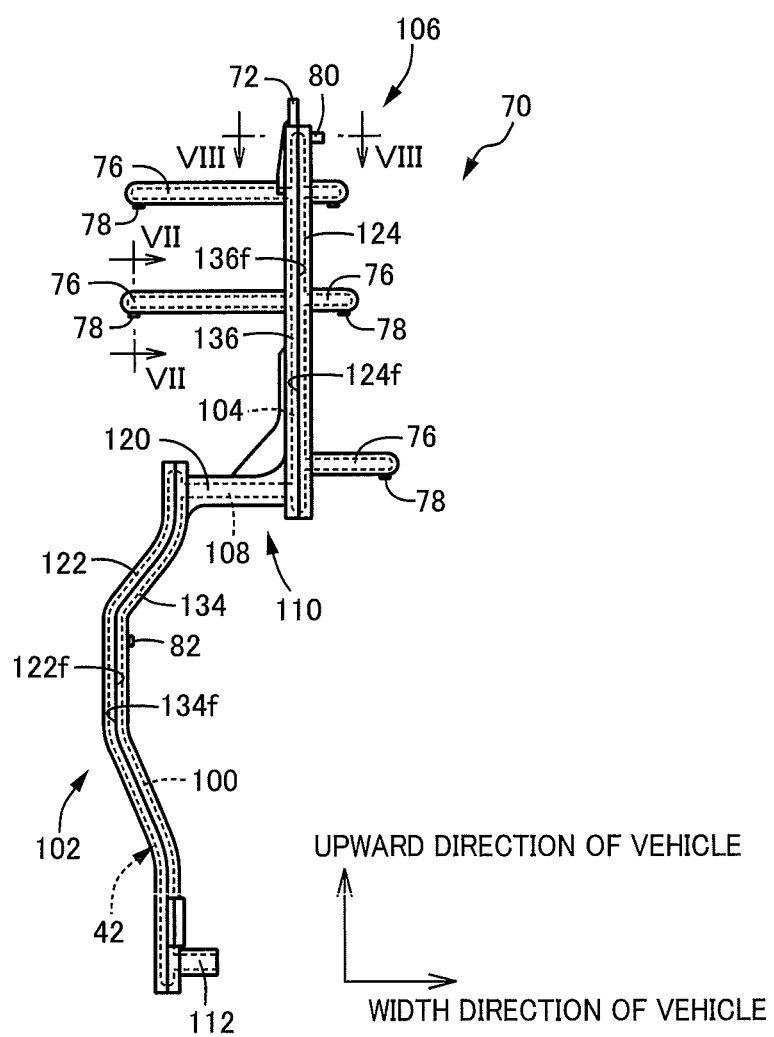
FIG. 5 is a side elevational view of the resin piping assembly as seen in the leftward direction of FIG. 4.

FIG. 4 is the front elevational view of the resin piping assembly 70 of FIG. 3 as seen in the width or transverse direction of the hybrid vehicle 10, and FIG. 5 is the side elevational view of the resin piping assembly 70 as seen in the leftward direction of FIG. 4. The resin piping assembly 70 is a three-dimensional structure, and the first oil supply passage 42 is accordingly a three-dimensional passage indicated by broken lines in FIG. 5. Described more specifically, the resin piping assembly 70 includes a first pipe portion 102 having a first passage portion 100, a second pipe portion 106 having a second passage portion 104, and a connecting pipe portion 110 having a connecting passage portion 108 for communication between the ends of the first and second passage portions 100 and 104. The first oil supply passage 42 consists of the first passage portion 100, the connecting passage portion 108 and the second passage portion 104. The connecting pipe portion 110 having the connecting passage portion 108 extends substantially linearly in the width direction of the hybrid vehicle 10 and in a substantially horizontal direction, and is connected to the first and second pipe portions 102 and 106, so as to intersect at right angles these pipe portions 102 and 106 respectively. As shown in FIG. 4, the first and second pipe portions 102 and 106 extend from the connecting pipe portion 110 in the respective opposite vertical directions (downward and upward directions). The first pipe portion 102 has a cylindrical connector port 112 formed at its lower end part remote from the connecting pipe portion 110 such that the connector port 112 extends linearly in the horizontal direction (width direction of the hybrid vehicle 10) parallel to the connecting pipe portion 110. The connector port 112 corresponds to a connecting portion which is connected to the first oil pump P1 and through which the lubricant oil 48 flows from the first oil pump P1 into the first oil supply passage 42 formed through the resin piping assembly 70.

Figure 6:
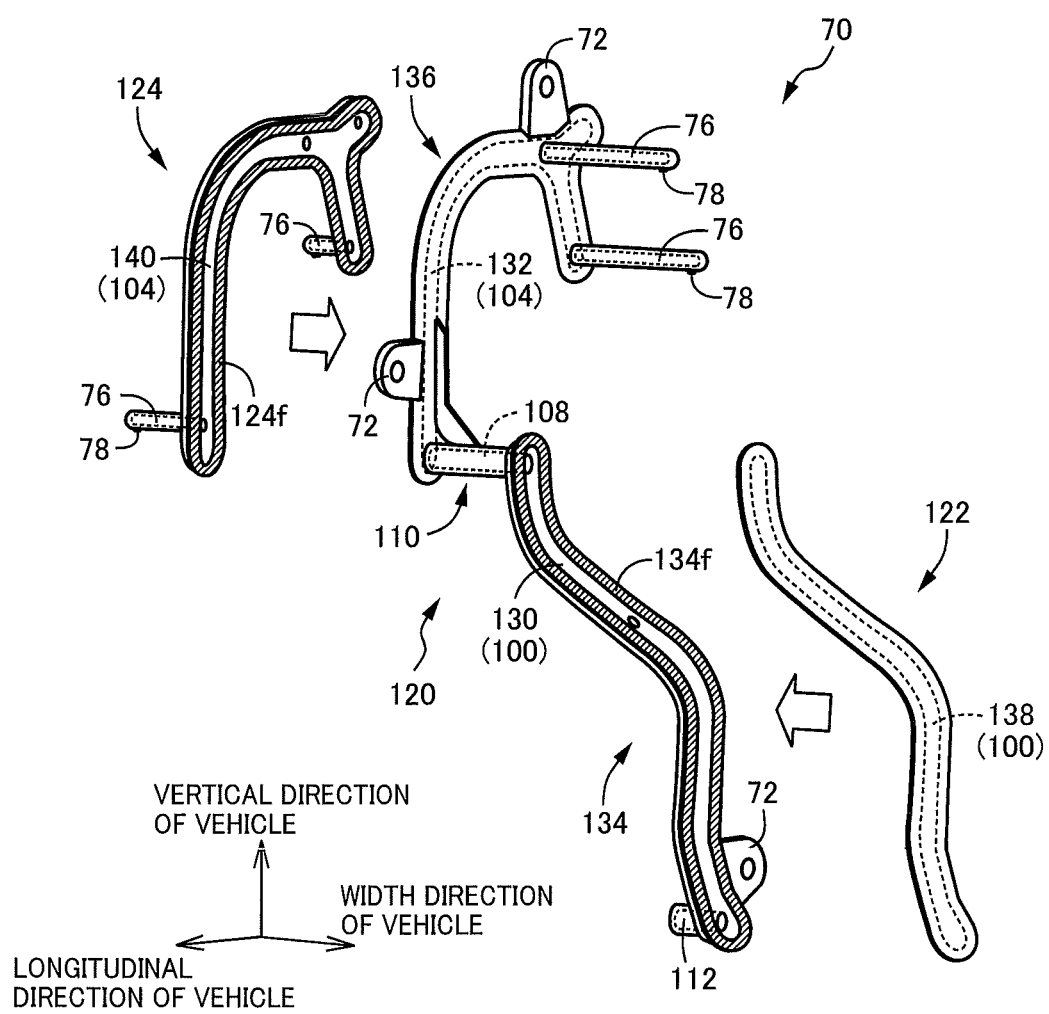
FIG. 6 is a perspective view of three divisional components of the resin piping assembly before the divisional components are bonded together to form the resin piping assembly.

The resin piping assembly 70 includes a plurality of divisional components corresponding two of which cooperate to define the first oil supply passage 42 along its length. Each divisional component is made of resin material. As shown in FIG. 6, the resin piping assembly 70 according to the present embodiment consists of three divisional components, that is, a base divisional component 120, a first divisional component 122 and a second divisional component 124. The base divisional component 120 consists of a pair of half components, that is, a first half component 134 and a second half component 136 which have respective first and second A-grooves 130 and 132 which are open in respective opposite directions. The first and second half components 134 and 136 also have respective interfacial surfaces 134f and 136f. The first A-groove 130 is open in the direction of the interfacial surface 134f, i.e., the normal direction of the interfacial surface 134f or a direction perpendicular to the interfacial surface 134f, namely, open in the leftward direction as seen in FIG. 5, and the second A-groove 132 is open in the direction perpendicular to the interfacial surface 136f namely, open in the rightward direction as seen in FIG. 5. That is, the first and second A-grooves 130 and 132 are open in the respective opposite directions parallel to the width direction of the hybrid vehicle 10, and the first and second half components 134 and 136 are offset or spaced apart from each other in the width direction of the hybrid vehicle 10. Described more specifically, the first half component 134 is offset or spaced apart from the second half component 136 in the rightward direction parallel to the width direction of the hybrid vehicle 10, as seen in FIG. 6, while the second A-groove 132 formed in the second half component 136 is open in the leftward direction. The first and second half components 134 and 136 are connected to each other at their respective upper and lower end portions, by the connecting pipe portion 110 extending in the width direction of the hybrid vehicle 10, such that the first and second half components 134 and 136 extend from the connecting pipe portion 110 in the respective vertically opposite directions, that is, in the downward and upward directions. The connecting passage portion 108 formed through the connecting pipe portion 110 is open in bottom walls of the first and second A-grooves 130 and 132. The above-indicated connector port 112 extends integrally from the lower end portion of the first half component 134, linearly parallel with the connecting pipe portion 110, in the direction opposite to the direction in which the first A-groove 130 is open, while the projecting nozzle portions 76 extend integrally from the second half component 136, linearly parallel with the connecting pipe portion 110, in the direction opposite to the direction in which the second A-groove 132 is open. Hatching lines in FIG. 6 around the first A-groove 130 represent the interfacial surface 134f, for easier recognition of the interfacial surface 134f.

For instance, the base divisional component 120 constructed as described above is formed by an injection molding process, together with the connecting pipe portion 110 having the connecting passage portion 108, the projecting nozzle portions 76, the cylindrical connector port 112, the first and second A-grooves 130 and 132 and the fixing portions 72, by using an injecting molding device provided with a pair of forming molds, that is, a stationary mold and a movable mold which are movable toward and away from each other in the direction parallel to the connecting pipe portion 110, the projecting nozzle portions 76 and the connector port 112. The thus formed base divisional component 120 may be subjected to a machining operation for its intricate shaping adjustment, as needed. For instance, the connecting pipe portion 110 may be subjected to a machining operation on its outer circumferential surface, to remove unnecessary stock or burrs. For instance, each of the first oil delivery portions 78 of the projecting nozzle portions 76 may be formed by the injection molding process to form the base divisional component 120, with a movement of a slidable mold which is incorporated within the movable mold and which is movable by a cam, in the direction perpendicular to the above-indicated direction of movement of the movable mold, in synchronization of the movement of the movable mold. However, the first oil delivery portions 78 may be formed by a machining operation, for example, after the injection molding process. While the fixing portions 72 are formed integrally with the base divisional component 120 by the injection molding process, annular reinforcing metallic plates are embedded in the fixing portions 72 as needed, by an insert-molding process.

The first divisional component 122 has a first B-groove 138 and cooperates with the first half component 134 of the base divisional component 120, to define therebetween the first passage portion 100. The first divisional component 122 has an interfacial surface 122f around an opening of the first B-groove 138. The first divisional component 122 is bonded to the first half component 134 such that the interfacial surface 122f is held in abutting contact with the interfacial surface 134f around an opening of the first A-groove 130. Thus, the first passage portion 100 is defined by the first A-groove 130 and the first B-groove 138. The first B-groove 138 is open in the direction perpendicular to the interfacial surface 122f of the first divisional component 122, namely, open in the rightward direction as seen in FIG. 5, so that the interfacial surface 134f of the first half component 134 and the interfacial surface 122f of the first divisional component 122 are fluid-tightly abuttable with each other. The interfacial surface 134f have recesses and protrusions for fluid-tight contact with respective protrusions and recesses of the interfacial surface 122f.

For instance, the thus formed first divisional component 122 is formed with the first B-groove 138, by an injection molding process, by using an injecting molding device provided with a pair of forming molds, that is, a stationary mold and a movable mold which are movable toward and away from each other in the direction perpendicular to the interfacial surface 122f, namely, in the direction in which the first B-groove 138 is open. The thus formed first divisional component 122 may be subjected to a machining operation for its intricate shaping adjustment, as needed.

The second divisional component 124 has a second B-groove 140 and cooperates with the second half component 136 of the base divisional component 120, to define therebetween the second passage portion 104. The second divisional component 124 has an interfacial surface 124f around an opening of the second B-groove 140. The second divisional component 124 is bonded to the second half component 136 such that the interfacial surface 124f is held in abutting contact with the interfacial surface 136f around an opening of the second A-groove 132. Thus, the second passage portion 104 is defined by the second A-groove 132 and the second B-groove 140. The second B-groove 140 is open in the direction perpendicular to the interfacial surface 124f of the second divisional component 124, namely, open in the leftward direction as seen in FIG. 5, so that the interfacial surface 136f of the second half component 136 and the interfacial surface 124f of the second divisional component 124 are fluid-tightly abuttable with each other. The interfacial surface 136f have recesses and protrusions for fluid-tight contact with respective protrusions and recesses of the interfacial surface 124f. As shown in FIG. 5, the second divisional component 124 has the plurality of integrally formed projecting nozzle portions 76 linearly extending in the width direction of the hybrid vehicle 10, more specifically, in the direction opposite to the direction in which the second B-groove 140 is open. Hatching lines in FIG. 6 around the second B-groove 140 represent the interfacial surface 124f, for easier recognition of the interfacial surface 124f.

For instance, the thus formed second divisional component 124 is formed with the projecting nozzle portions 76 and the second B-groove 140, by an injection molding process, by using an injecting molding device provided with a pair of forming molds, that is, a stationary mold and a movable mold which are movable toward and away from each other in the direction parallel to the projecting nozzle portions 76. The thus formed second divisional component 124 may be subjected to a machining operation for its intricate shaping adjustment, as needed. The first oil delivery portions 78 of the projecting nozzle portions 76 may be formed by the injection molding process to form the second divisional component 124, with movements of slidable dies which are incorporated within the movable mold and which are movable by cams, for instance, in the direction perpendicular to the above-indicated direction of movement of the movable mold, in synchronization of the movement of the movable mold. However, the first oil delivery portions 78 may be formed by a machining operation after the injection molding process.

Then, the first and second divisional components 122 and 124 are integrally bonded to the respective first and second half components 134 and 136 of the base divisional component 120, by a vibration welding process. Namely, the first divisional component 122 and the first half component 134 are pressed in the respective leftward and rightward directions as seen in FIG. 5, for pressing fluid-tight contact of the interfacial surfaces 122f and 134f with each other in the direction substantially perpendicular to these surfaces 122f and 134f, while the components 122 and 134 are vibrated in the directions perpendicular to the plane of the view of FIG. 5 such that the interfacial surfaces 122f and 134f are kept in pressing sliding contact with each other, whereby these interfacial surfaces 122f and 134f are welded together due to generated friction heat. As a result, the first pipe portion 102 having the first passage portion 100 is obtained.

Similarly, the second divisional component 124 and the second half component 136 are pressed in the respective leftward and rightward directions as seen in FIG. 5, for pressing fluid-tight contact of the interfacial surfaces 124f and 136f with each other in the direction substantially perpendicular to these surfaces 124f and 136f, while the components 124 and 136 are vibrated in the directions perpendicular to the plane of the view of FIG. 5, or in the upward and downward directions, such that the interfacial surfaces 124f and 136f are kept in pressing sliding contact with each other, whereby these surfaces 124f and 136f are welded together due to friction heat. As a result, the second pipe portion 106 having the second passage portion 104 is obtained. The thus obtained second pipe portion 106 is connected to the first pipe portion 102, whereby the desired resin piping assembly 70 is manufactured. It is noted that the first and second divisional components 122 and 124 can be integrally bonded to the base divisional component 120 by a process other than the vibration welding process, for example, by using an adhesive agent.

Figure 7:
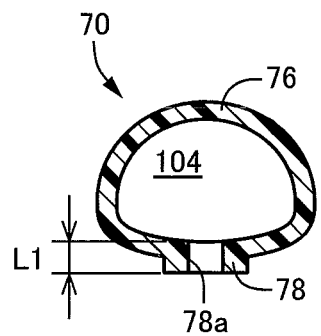
FIG. 7 is a cross sectional view of a first oil delivery portion taken along lines VII-VII in FIG. 5.

Each of the first oil delivery portions 78 of the projecting nozzle portions 76 has a first oil delivery nozzle 78a linearly formed therethrough with a predetermined diameter, as shown in the cross sectional view of FIG. 7, which is taken along lines VII-VII in FIG. 5. The oil 48 delivered from the first oil pump P1 and flowing through the second passage portion 104 is ejected downwards from the first oil delivery nozzle 78a toward the lubricated portions such as the bearings 62 and the gears 64, so that the lubricated portions are lubricated with the ejected oil 48. The diameter of the first oil delivery nozzle 78a is determined so as to adequately lubricate the lubricated portions even when the oil 48 has a low temperature and an accordingly high degree of viscosity. The first pipe portion 102 has a third oil delivery portion 82 (shown in FIGS. 3 and 5) having a structure similar to that of the first oil delivery portion 78, so that the differential gear device 32 is lubricated with the oil 48 ejected from the third oil delivery portion 82. The third oil delivery portion 82 has an oil delivery nozzle identical with the first oil delivery nozzles 78*a* of the first oil delivery portions 78 and which is considered to be another first oil delivery nozzle for lubricating the lubricated portions.

The oil 48 delivered from the first oil delivery portions 78 and the third oil delivery portion 82 to the lubricated portions such as the gears 64 and the differential gear device 32 causes a loss of power to be transmitted through the power transmitting mechanism 16, due to resistances of the oil 48 to the rotary motions of the gears 64 and to the rotary motion of the differential gear device 32 to splash up the oil from the first oil reservoir portion 52. Described in detail, the amount of the oil 48 delivered from the mechanical oil pump P1 operated with the rotary motions of the drive wheels 38 is determined by the running speed V of the hybrid vehicle 10 such that the amount of delivery of the oil 48 increases with an increase of the running speed V, so that there is a risk that an excessively large amount of the oil 48 is delivered from the first oil delivery portions 78 and the third oil delivery portion 82 to the lubricated portions such as the gears 64 and the differential gear device 32, when the running speed V of the hybrid vehicle 10 is relatively high. To reduce this risk, the above-indicated second pipe portion 106 has a second oil delivery portion 80 formed at its upper end so as extend outwardly from its outer wall surface. The second oil delivery portion 80 has a second oil delivery nozzle 80*a* linearly formed therethrough with a predetermined diameter, as shown in the cross sectional view of FIG. 8, which is taken along lines VIII-VIII in FIG. 5. The second oil delivery portion 80 extends linearly in parallel with the projecting nozzle portions 76, in the width direction of the vehicle 10. A portion of the oil 48 delivered from the first oil pump P1 and flowing through the second passage portion 104 is ejected from the second oil delivery nozzle 80*a*, and flows into an oil catcher tank 86 (shown in FIGS. 2 and 9). Thus, an excess of the oil 48 is delivered from the second oil delivery nozzle 80*a* and received in the oil catcher tank 86, so that the amount of the oil 48 to be delivered to the lubricated portions such as the gears 64 is reduced by an amount received in the oil catcher tank 86, whereby the loss of power to be transmitted through the power transmitting mechanism 16 is reduced. The oil catcher tank 86 functions as an oil catcher to receive a portion of the oil delivered from the first oil pump P1.

Figure 9:
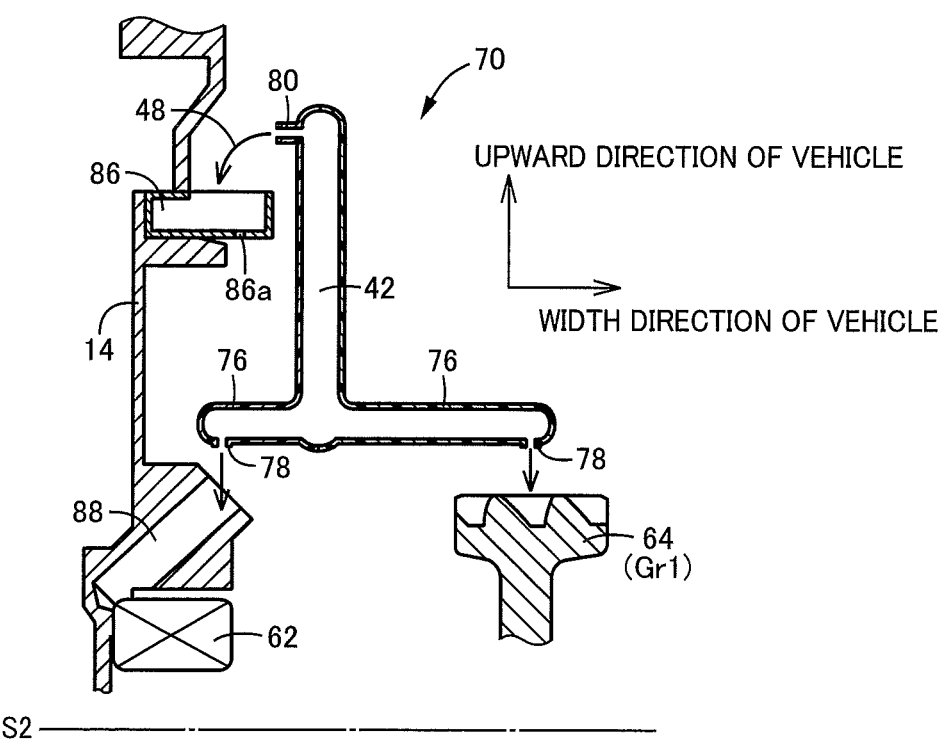
FIG. 9 is a schematic cross sectional view showing an upper end portion of the resin piping assembly, taken in a plane which is parallel to a direction of extension of an oil passage of the resin piping assembly and in which the three oil delivery portions lie, the cross sectional view indicating positions of the three oil delivery portions relative to an oil catcher tank and lubricated portions of the power transmitting system.

FIG. 9 is the schematic cross sectional view showing an upper end portion of the resin piping assembly 70. The cross sectional view indicates relative positions between the two first oil delivery portions 78 and the lubricated portions in the form of the bearing 62 and gear 64, and relative positions between the second oil delivery portion 80 and the oil catcher tank 86. The bearing 62 shown in FIG. 9 rotatably supports the shaft 28 of the speed reducing gear device 30 disposed on the second axis S2, while the gear 64 is the large-diameter speed reducing gear Gr1 provided on the shaft 28. The casing 14 has a communication passage 88 which receives the oil 48 ejected from a left-hand side one of the two first oil delivery portions 78, and through which the oil 48 is directed to the bearing 62. The oil catcher tank 86 is formed separately from the casing 14 and fixed to the casing 14, and has a drain port 86*a* formed through its bottom wall and having a comparatively small diameter. The oil 48 temporarily stored in the oil catcher tank 86 is discharged at a relatively low rate of flow from the drain port 86*a*, and is returned back into the oil reservoir 46. In the present embodiment, the drain port 86*a* is positioned such that the oil 48 discharged from the drain port 86*a* is supplied to the bearing 62. However, the drain port 86*a* may be positioned such that the oil 48 is supplied to the other lubricated portion, or is returned directly back into the oil reservoir 46.

If the diameter of the second oil delivery nozzle 80*a* is reduced to permit a sufficient amount of the oil 48 to be delivered from the first oil delivery portions 78 and the third oil delivery portion 82 to the lubricated portions such as the gear 64 and the differential gear device 32 when the oil 48 has a low temperature and an accordingly high degree of viscosity, the amount of the oil 48 delivered from the second oil delivery nozzle 80*a* is reduced, with a result of an excessively large amount of delivery of the oil 48 from the first oil delivery nozzles 78*a* to the lubricated portions, when the oil 48 has a high temperature and an accordingly low degree of viscosity. If the diameter of the second oil delivery nozzle 80*a* is set to be large enough to permit an excess of the oil 48 to be delivered from the second oil delivery nozzle 80*a* at a comparatively high temperature of the oil 48, on the other hand, the sufficient amount of the oil 48 cannot be delivered from the first oil delivery nozzles 78*a* to the lubricated portions when the oil 48 has a comparatively low temperature and an accordingly high degree of viscosity, so that there is a risk of deterioration of the anti-seizure function and the other lubricating performance of the lubricating device 40.

Figure 8:
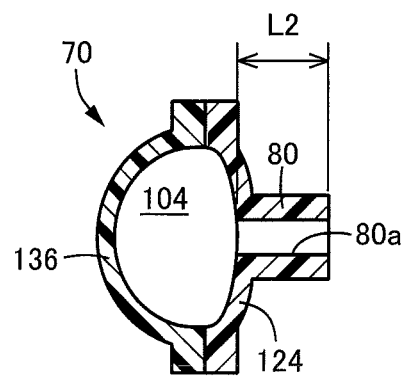
FIG. 8 is a cross sectional view of a second oil delivery portion taken along lines VIII-VIII in FIG. 5.

In the present embodiment, a length L2 of the second oil delivery nozzle 80*a* (in its direction of linear extension) indicated in FIG. 8 is determined to be larger than a length L1 of the first oil delivery nozzle 78*a* (in its direction of linear extension) indicated in FIG. 7. An increase of the length L2 of the second oil delivery nozzle 80*a* causes an increase of an area of contact of the oil 48 with an inner wall surface of the second oil delivery nozzle 80*a*, and a consequent increase of an amount of friction of the oil 48 with respect to the inner wall surface during a flow of the oil 48 through the second oil delivery nozzle 80*a*, with a result of restriction of the flow of the oil 48 when the oil 48 has a low temperature and an accordingly high degree of viscosity. Accordingly, an amount of the oil 48 delivered from the first oil delivery nozzle 78*a* is increased, so that the lubricating device 40 has the desired lubricating performance even at the low temperature of the oil 48. On the other hand, the amount of friction of the oil 48 with respect to the inner wall surface of the second oil delivery nozzle 80*a* during the flow of the oil 48 through the second oil delivery nozzle 80*a* is comparatively small when the oil 48 has a comparatively high temperature and an accordingly low degree of viscosity. Accordingly, as the temperature of the oil 48 is lowered, the amount of the oil delivered from the second oil delivery nozzle 80*a* is increased while the amount of the oil 48 delivered from the first oil delivery nozzle 78*a* to the lubricated portions such as the gear 64 is reduced, so that the loss of power to be transmitted through the power transmitting mechanism 16 is reduced. A ratio of the length L2 of the second oil delivery nozzle 80*a* to the length L1 of the first oil delivery nozzle 78*a* is suitably determined according to the viscosity characteristics and the diameter of the oil 48. For example, the ratio is selected within a range of about 2-5. In the present embodiment, the first and second oil delivery nozzles 78*a* and 80*a* have substantially the same diameter, and the length L2 is determined to be about 3 times the length L1. For the second oil delivery nozzle 80a to have this length L2, the second oil delivery portion 80 is formed integrally with the second divisional component 124, so as to extend outwardly from an outer wall surface of the second passage portion 104. The direction of extension of the second oil delivery portion 80 is parallel to the direction of movement of the movable mold used to form the second divisional component 124. A distance of extension of the second oil delivery portion 80 is suitably determined depending upon the length L2 of the second oil delivery nozzle 80a. It is noted that the second oil delivery portion 80 is a projecting oil delivery portion formed so as to extend outwardly from the outer wall surface of the resin piping assembly 70.

In the lubricating device 40 provided for lubricating the transaxle 12, the length L2 of the second oil delivery nozzle 80a from which the oil 48 flows into the oil catcher tank 86 is larger than the length L1 of the first oil delivery nozzle 78a from which the oil 48 is delivered to the lubricated portions such as the tooth surfaces of the gear 64. Accordingly, when the oil 48 has a comparatively low temperature and an accordingly high degree of viscosity, the amount of friction of the oil 48 with respect to the inner wall surface of the second oil delivery nozzle 80a is comparatively large so that the amount of the oil 48 flowing from the second oil delivery nozzle 80a into the oil catcher tank 86 is restricted, whereby a sufficient amount of the oil 48 can be delivered from the first oil delivery nozzle 78a to each lubricated portion. When the oil 48 has a comparatively high temperature and an accordingly low degree of viscosity, on the other hand, the amount of friction of the oil 48 with respect to the inner wall surface of the second oil delivery nozzle 80a is comparatively small so that the oil 48 can easily flow from the second oil delivery nozzle 80a into the oil catcher tank 86, whereby an excessive amount of supply of the oil 48 from the first oil delivery nozzle 78a to the lubricated portion is prevented.

Namely, the present lubricating device 40 is provided with the oil catcher tank 86 to receive an excess of the oil 48 delivered from the second oil delivery nozzle 80a, to prevent a large loss of power to be transmitted through the power transmitting mechanism 16 of the transaxle 12, when the lubricated portions such as the gear 64 are lubricated with the oil 48 delivered from the first oil delivery nozzle 78a. Accordingly, the amount of the oil 48 to be delivered from the first oil delivery nozzle 78a to each lubricated portion is reduced, whereby the loss of power is accordingly reduced. The length L2 of the second oil delivery nozzle 80a from which the oil 48 flows into the oil catcher tank 86 is determined so as to permit an excess of the oil 48 delivered from the second oil delivery nozzle 80a, to be received in the oil catcher tank 86 to prevent delivery of an excessively large amount of the oil 48 from the first oil delivery nozzle 78a to each lubricated portion, when the oil 48 has a comparatively high temperature, while at the same time ensuring delivery of a sufficient amount of the oil 48 from the first oil delivery nozzle 78a to the lubricated portion when the oil 48 has a comparatively low temperature. Thus, the present lubricating device ensures effective reduction of the loss of power to be transmitted through the power transmitting mechanism 16, as well as high degrees of anti-seizure function and other lubricating performance, and cooling performance.

Further, the present lubricating device 40 is provided to lubricate the transaxle 12 of the hybrid vehicle 10, and is provided with the mechanical oil pump P1 operated with the rotary motions of drive wheels 38. The amount of the oil 48 delivered from the mechanical oil pump P1 is determined by the running speed V of the hybrid vehicle 10, so that a comparatively large amount of the oil 48 is delivered from the mechanical oil pump P1 when the vehicle running speed V is comparatively high. Accordingly, the provision of the oil catcher tank 86 permits effective reduction of the loss of power to be transmitted through the transaxle 12. Although the amount of the oil 48 to be delivered from the mechanical oil pump P1 cannot be controlled in the present lubricating device 40, the length L2 of the second oil delivery nozzle 80a is determined to be larger than the length L1 of the first oil delivery nozzle 78a, so that an excess of the oil 48 delivered from the second oil delivery nozzle 80a is received in the oil catcher tank 86 to prevent delivery of an excessively large amount of the oil 48 from the first oil delivery nozzle 78a to each lubricated portion, when the oil 48 has a comparatively high temperature, while at the same time a sufficient amount of the oil 48 is delivered from the first oil delivery nozzle 78a to the lubricated portion when the oil 48 has a comparatively low temperature.

The present lubricating device 40 is also configured such that the resin piping assembly 70 has the projecting oil delivery portion in the form of the second oil delivery portion 80 extending outwardly from its outer wall surface, and the second oil delivery portion 80 is provided with the second oil delivery nozzle 80a. Accordingly, the length L2 of the second oil delivery nozzle 80a can be easily adjusted by forming the second oil delivery portion 80 with a suitable distance of extension outwardly of the oil piping assembly.

The present lubricating device 40 is further configured such that the resin piping assembly 70 is constituted by the three divisional components 120, 122 and 124 bonded to each other so as to define the first oil supply passage 42. The projecting oil delivery nozzle in the form of the second oil delivery portion 80 is formed integrally with one of these three divisional components 120, 122 and 124, more specifically, with the second divisional component 124. This resin piping assembly 70 is more economical to manufacture than an oil piping assembly to which an oil delivery nozzle member formed separately from an oil piping assembly and having a suitable length dimension is fixed with screws or other fastening means.

While the preferred embodiment of the invention has been described for illustrative purpose only, it is to be understood that the present invention may be embodied with various changes and improvements, which may occur to those skilled in the art.

NOMENCLATURE OF ELEMENTS

10: hybrid vehicle (vehicle)
12: transaxle (power transmitting system)
14: casing
16: power transmitting mechanism
20: engine (drive power source)
32: differential gear device (lubricated portion)
38: drive wheels
40: lubricating device
42: first oil supply passage (oil passage)
46: oil reservoir
48: lubricant oil
62: bearings (lubricated portion)
64: gears (lubricated portion)
70: resin piping assembly (oil piping assembly)
78: first oil delivery portions
78a: first oil delivery nozzles

80: second oil delivery portion (projecting oil delivery portion)
80a: second oil delivery nozzle
86: oil catcher tank (oil catcher)
120: base divisional component
122: first divisional component
124: second divisional component
P1: first oil pump (oil pump)
L1: length of first oil delivery nozzle
L2: length of second oil delivery nozzle

What is claimed is:

1. A lubricating device of a power transmitting system including a power transmitting mechanism accommodated in a casing, comprising:
    an oil reservoir formed in a bottom portion of the casing;
    an oil pump operated to suck an oil from the oil reservoir, and pressurize the oil and deliver the pressurized oil to at least one lubricated portion of the power transmitting mechanism;
    an oil catcher provided to receive a portion of the oil delivered from the oil pump; and
    an oil piping assembly through which the oil delivered from the oil pump flows to be delivered to each of the at least one lubricated portion, wherein:
        the oil piping assembly has a first oil delivery nozzle from which the oil is delivered to each lubricated portion, and a second oil delivery nozzle from which the portion of the oil delivered from the oil pump flows into the oil catcher,
        the second oil delivery nozzle has a length in a direction in which the oil flows larger than that of the first oil delivery nozzle,
        the oil piping assembly has projecting nozzle portions and a projecting oil delivery portion each extending outwardly from an outer wall surface thereof, and each of the projecting nozzle portions and the projecting oil delivery portion is provided with the first oil delivery nozzle and the second oil delivery nozzle, respectively,
        the oil piping assembly is a resin piping assembly having a plurality of divisional components each of which is formed of a resin material and which have respective interfacial surfaces, the plurality of divisional components being bonded together with the interfacial surfaces being held in abutting contact with each other, so as to define an oil passage through which the oil flows,
        the projecting oil delivery portion and at least one of the projecting nozzle portions are formed integrally with one of the plurality of divisional components, and
        the projecting oil delivery portion extends linearly in parallel with the at least one of the projecting nozzle portions.

2. The lubricating device according to claim 1, wherein the power transmitting system is configured to transmit an output of a drive power source of a vehicle to drive wheels of the vehicle, and the oil pump is a mechanical oil pump mechanically connected to the drive wheels so that the oil pump is operated with rotary motions of the drive wheels.

3. The lubricating device according to claim 1, wherein there is only one of the second oil delivery nozzle.

4. The lubricating device according to claim 1, wherein the first oil delivery nozzle and the second oil delivery nozzle have substantially the same diameter.

* * * * *